Oct. 23, 1956   S. H. FILLION   2,767,859
RAILWAY DRAFT GEARS
Filed Feb. 16, 1954
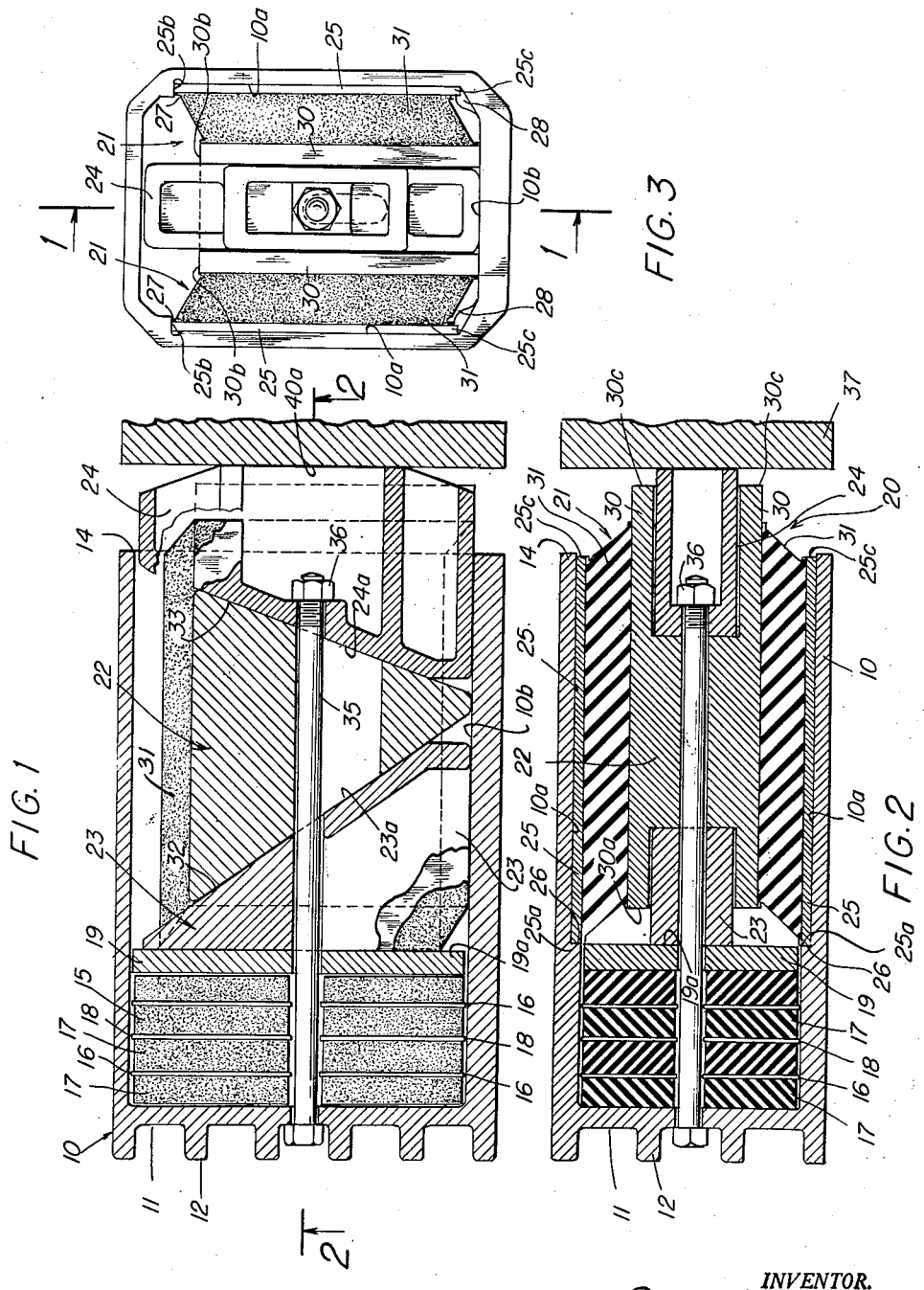
INVENTOR.
Stanley H. Fillion
BY
Pennie Edmonds Morton Barrows Taylor
ATTORNEYS United States Patent Office 2,767,859
Patented Oct. 23, 1956

2,767,859

RAILWAY DRAFT GEARS

Stanley H. Fillion, Scarsdale, N. Y., assignor to Waugh Equipment Company, New York, N. Y., a corporation of Maine Application February 16, 1954, Serial No. 410,495

5 Claims. (Cl. 213—45)

This invention relates to cushioning devices, in which part of the applied energy is absorbed by conversion into frictional heat and dissipation of such heat, while the remainder is stored in the device and is available for restoration of the device to its original condition. More particularly, the invention is concerned with a novel cushioning device, which has large capacity and occupies relatively little space, so that it is well adapted for use as a draft gear for railway vehicles. The new device is similar to that disclosed and claimed in my prior copending application Serial No. 387,972, filed October 23, 1953, but differs from the device of that application in respects, which will be pointed out hereafter.

The cushioning device of the prior application in one form suitable as a railway draft gear comprises a pair of shear blocks, each consisting of a pair of parallel metal plates and a mass of rubber between the plates and bonded to areas on their opposed surfaces. The shear blocks lie in parallel spaced relation within a housing, and the outer plate of each shear block lies in contact with an inner wall of the housing and also engages a movable abutment at its inner end edge. The inner plates of the shear blocks are movable relative to the outer plates against the resistance of the rubber in shear and the inner plates are attached to a friction shoe movable along a wedge member. The wedge rests on a wall of the housing in contact with the abutment and movement of the latter is resisted by resilient elements which are preferably rubber springs. The movement of the shoe is effected by a plunger having a friction surface engaging a similar surface on the shoe and the plunger projects out of the housing. When load is applied to the plunger, it moves into the housing along the wall, on which the wedge is seated, and the movement of the plunger causes the shoe to move along the friction surfaces of the plunger and wedge. As the movement continues, the movable abutment is moved inward against the resistance of the rubber springs, and when the abutment moves, the outer plates of the shear blocks move with it along the housing walls. Accordingly, during the inward movement of the plunger under load, friction is generated between the shoe and the plunger and wedge, between the housing and the plunger and wedge, and between the housing and the outer plates of the shear blocks. When the load is removed, the rubber springs move the abutment outward to its initial position and the outer plates of the shear blocks are moved outward with the abutment along the housing walls.

In devices, such as that described in the prior application, it is desirable that the rubber masses of the shear blocks be subjected to cross-compression, that is, compression in a direction substantially normal to the plates of the shear blocks, since the rubber then has a longer life. However, if the shear blocks are installed under substantial cross-compression in the prior device, the friction between the housing walls and the outer plates of the shear blocks may be so great, that the energy stored in the rubber springs during compression of the device may not be sufficient to restore the abutment and the outer plates to their original positions, when the load is removed.

The present invention is directed to a cushioning device similar to that shown in my prior application, but differing therefrom in that the shear blocks may be installed under desired cross-compression without danger of the device sticking and failing to return to its original condition upon release of an applied load. In the new device, the outer plates of the shear blocks lie wholly within the housing and are seated against internal shoulders on the walls thereof. When load is applied to the plunger, part of the energy is stored in the rubber masses of the shear blocks and in the rubber springs and part is converted into frictional heat generated by the movement of the shoe on the friction surfaces of the plunger and wedge and by the movement of the wedge and plunger along the inner wall of the housing. However, during the application of a load, there is no movement of the outer plates of the shear blocks along the housing wall and none of the applied energy is converted into friction between the plates and housing. Accordingly, restoration of the device to its original condition requires only that the abutment, wedge, shoe, and plunger be moved to their initial positions, and the amount of energy stored in the rubber masses of the shear blocks and the rubber springs is adequate for that purpose.

For a better understanding of the present invention reference may be had to the accompanying drawing, in which:

Fig. 1 is a view in longitudinal section, partly broken away, of the new cushioning device, taken along lines 1—1 of Fig. 3;

Fig. 2 is a view in section taken along lines 2—2 of Fig. 1; and

Fig. 3 is an end view, taken from the right of the device shown in Fig. 1.

The draft gear illustrated in Figs. 1-3, inclusive, comprises a housing 10, which is oblong in section and has one end 11 closed and strengthened by ribs 12, and the other end 14 open. A cushioning unit 15 is seated against the inner face of the closed end 11 of the housing and the unit includes a plurality of rubber springs, each made up of a center plate 16 and masses of rubber 17 secured to opposite faces thereof. Adjacent springs in the unit are separated by a flat divider plate 18 and the outer end of the unit is engaged by a plate 19 serving as a movable abutment.

The housing 10 also contains a cushioning unit 20 made up of a pair of rubber shear blocks 21, a shoe 22, a wedge member 23 and a plunger 24. Each shear block 21 comprises an outer metal plate 25 lying against an inner wall 10a of the housing, with its forward edge 25a bearing against an internal shoulder 26 extending transversely of one side wall 10a of the housing wall. One longitudinal edge 25b of each plate 25 bears against an internal longitudinal shoulder 27 formed along the housing side wall 10a and the opposite edge 25c of each plate 25 is secured against the housing side wall 10a by a longitudinal internal rib 28, which overlies the edge 25c. Each shear block 21 also includes an inner plate 30 which is connected in offset relation to the outer plate 25 by a mass of rubber 31 bonded to the opposing faces of the plates. In the construction illustrated, the inner plates 30 of the two shear blocks 21 are formed integral with a shoe 22 resting upon and movable along a wall 10b of the housing.

The inner and outer faces 32, 33 of shoe 22 lie at an angle to each other and are formed with friction surfaces with the surface on the inner face 32 engaging a friction surface 23a on the wedge member 23.

The wedge member 23 rests upon housing wall 10b and its inner end engages the outer face 19a of the movable abutment 19. The outer friction surface 33 of the shoe 22 is engaged by an inclined friction surface 24a formed on the forward end of the plunger 24, which extends into the housing through the open end 14 thereof.

A tie bolt 35 passes through aligned openings in the plunger 24, shoe 22, wedge 23, cushioning unit 15, and the end wall 11 of the housing and a nut 36 threaded on the end of the bolt lies within the hollow interior of the plunger. The tie bolt serves as a convenient means for applying initial compression exerted to the cushioning unit 15.

When the new cushioning device is used as a railway draft gear, the device is mounted within the usual coupler yoke and lies within the usual draft pocket having stops at its opposite ends. The closed end 11 of the housing engages a pair of stops at one end of the pocket and the plunger 24 engages a follower 37 in contact with the stops at the other end of the pocket. In the normal condition of the device, the outer and inner plates 25, 30 of the shear blocks 21 are initially offset in two directions. Thus the upper longitudinal edges 25b of the outer plates 25 are disposed in a plane above the upper edges 30b of the inner plates 30 (Fig. 3) and the plates 25 lie wholly within the housing 10 while the ends 30c of the inner plates 30 project out through the open end 14 of the housing a substantial distance. The plunger 24 extends out of the housing 10 beyond the inner plates 30.

When the coupler is subjected to a force in buff or draft, the movement of the yoke effects a shortening of the overall length of the device and the plunger 24 is moved inwardly towards the closed end 11 of the housing. The shoe 22 is moved inwardly by the plunger and slides laterally along the inclined friction surfaces 23a and 24a of the wedge member 23 and plunger 24, respectively. In such movement of the shoe, the inner plates 30 of the shear blocks 21 are thus moved inwardly and laterally against the resistance in shear of the rubber masses 31. As the plunger and shoe are moved inwardly, force is applied to the movable abutment 19 through the wedge member 23, thereby tending to compress the cushioning unit 15. The plunger 24 is moved into the housing at a faster rate than the shoe 22, so that the follower 37 will eventually engage the outer ends 30c of the inner plates 30, after which the opposite or inner ends 30a of the plates 30 will bear against the movable abutment 19. From this point on, there will be relatively little travel of the plates 30 relative to the plates 25 seated on the internal shoulders 26.

As force is applied to the plunger, part of the energy is stored in the rubber masses of the shear blocks 21 and in the rubber springs 17 of the cushioning unit 15, and part is converted into frictional heat generated by the movement of the shoe along the friction surfaces of the plunger and wedge, and by the movement of the wedge and plunger along the housing wall. The energy converted into heat is absorbed and dissipated while the stored energy is utilized to return the parts to their initial condition when the load is released.

In the new device, the outer plates 25 of the shear blocks always remain stationary, regardless of the inward movement of the inner plates 30, by virtue of the fact that the inner ends 25a of the outer plates 25 are seated against the transverse shoulders 26 on the housing wall 10a. Restoration of the device to its original condition after release of a load, therefore, involves only the movement of the wedge, shoe, inner plates, and plunger outwardly relative to the housing and no movement of plates 25 along the housing walls is required. It is therefore possible to mount the shear blocks 21 initially under substantial cross compression, that is, compression in a direction substantially normal to the plates of the blocks 21, without danger of the outer plates 25 becoming so tightly held against the housing side wall 10a, when the plunger is moved inwardly, as to prevent return of the shear blocks to their initial condition, when the applied load is released.

I claim:

1. In a cushioning device, the combination of a pair of metal plates lying substantially parallel, a mass of rubber between the plates and bonded to their opposed faces, means supporting the plates and subjecting the rubber to compression in a direction substantially normal to the planes of the plates, said means including a stop engaged by one of said plates and preventing its movement in one direction substantially parallel to its plane, the second plate being movable in said direction relative to the first plate against the resistance of the rubber in shear, a shoe movable with the second plate, a member having a friction surface engaged and traversed by the shoe, a plunger operable to move the shoe and having a friction surface engaged and traversed by the shoe, cushioning means seated upon said supporting means and engaging the member, the cushioning means resisting the movement of the member by the shoe.

2. In a cushioning device, the combination of two pairs of metal plates lying substantially parallel, a mass of rubber between the plates of each pair and bonded to areas on their opposed faces, a housing for holding the plates and subjecting the rubber to compression in a direction substantially normal to the planes of the plates, the housing having a wall in contact with one plate of each pair and provided with a stop engaged by that plate for limiting its movement into the housing, the second plate being movable relatively to the housing against the resistance of the rubber in shear, a shoe within the housing movable with the second plates of the two pairs, a member having a friction surface engageable and traversable by the shoe, cushioning means within the housing resisting the movement of the member by the shoe, and a plunger extending into the housing and having a friction surface engaged and traversed by the shoe, the plunger being movable into the housing under load applied to the device in the direction of movement of the movable plates.

3. In a cushioning device, the combination of a housing having a closed end and an opposite open end, resilient cushioning means bearing against the closed end of the housing, a movable abutment within the housing bearing against the cushioning means, a wedge member movable within the housing toward and away from the closed end thereof and bearing against the movable abutment, the wedge member having a friction surface inclined to the direction of its movement, a pair of metal plates lying substantially parallel and within the housing, a mass of rubber between the plates and bonded to areas on their opposed faces, the housing having a wall in contact with one plate and provided with a stop engaged by that plate and limiting its movement into the housing, the second plate being movable edgewise in its plane against the resistance of the rubber in shear, a shoe within the housing movable with the second plate, the shoe having two frictional surfaces inclined to each other and to the direction of movement of the shoe, one of said surfaces bearing against the friction surface of the wedge member, and a plunger extending into the housing through its open end having an inclined friction surface engaging the other friction surface of the shoe, the plunger being movable into the housing under load applied in the direction of movement of the second plate.

4. A cushioning device comprising a housing, a pair of metal plates lying substantially parallel within the housing, a mass of rubber between the plates and bonded to areas on their opposed faces, one plate lying against a wall of the housing and engaging a shoulder formed thereon, the plate thereby being held against edgewise movement in one direction, the second plate being movable edgewise in its plane against the resistance of the rubber in shear, a shoe movable with the second plate and having two frictional surfaces inclined to each other and to the direction of movement of the shoe with the second plate, a wedge member having a frictional surface bearing against one of the frictional surfaces of the shoe, an abutment within the housing movable by the wedge member, when the latter is moved in said direction, the movable abutment also being moved by the second plate when the latter is moved in said one direction a predetermined distance, resilient means for resisting the movement of the abutment, and a plunger extending within the housing and having an inclined friction surface bearing against the other frictional surface of the shoe, the plunger being movable toward the interior of the housing against the resistance of the rubber in shear.

5. A cushioning device, which includes a housing having one end open and the opposite end closed, the housing having internal transverse shoulders on a pair of opposite walls, a pair of rubber shear blocks mounted in the housing, each shear block including an outer plate lying against one of said opposite housing walls with its inner end seated on the shoulder on said wall, an inner plate lying parallel to the outer plate, and a rubber mass lying between and bonded to the inner and outer plates, the inner plates being movable in their planes relative to the outer plates lengthwise of the housing and against the resistance of the rubber masses in shear a shoe lying between and connected to the inner plates of the shear blocks, the assembly of shear blocks and shoe being installed in the housing with the rubber masses under substantial compression in a direction substantially normal to the plates, the shoe having friction surfaces on its inner and outer faces, said surfaces lying inclined to each other and to the direction of movement of the inner plates, a wedge movable along a wall of the housing and having an inclined friction surface engaging the inner friction surface on the shoe, a cushioning unit within the housing in contact with its end wall, a movable abutment engaging the inner end of the cushioning unit and engaged by the wedge, and a plunger movable into and out of the housing along a wall thereof and having a friction surface engaging the outer friction surface on the shoe.

No references cited.